United States Patent [19]

Licata et al.

[11] 4,365,180
[45] Dec. 21, 1982

[54] STRIP WOUND DYNAMOELECTRIC MACHINE CORE

[75] Inventors: Joseph P. Licata; Dennis J. Ricker, both of Dayton, Ohio

[73] Assignee: General Motors Corporation, Detroit, Mich.

[21] Appl. No.: 277,275

[22] Filed: Jun. 25, 1981

[51] Int. Cl.³ .................... H02K 1/06; H02K 15/02
[52] U.S. Cl. .................................... 310/216; 29/598; 310/254; 310/261
[58] Field of Search ............ 310/42, 216, 218, 254, 310/259, 261, 179; 29/596, 598, 605, 609

[56] References Cited

U.S. PATENT DOCUMENTS

| | | | |
|---|---|---|---|
| 3,225,424 | 12/1965 | Wiley . | |
| 3,320,451 | 5/1967 | Wiley | 310/259 |
| 3,657,582 | 4/1972 | Phelon | 310/261 |
| 3,886,256 | 5/1975 | Ohuchi et al. | 310/216 |
| 4,102,040 | 7/1978 | Rich | 29/598 |
| 4,116,033 | 9/1978 | Iwaki et al. | 29/596 X |
| 4,202,196 | 5/1980 | Asai et al. | 29/596 X |
| 4,206,621 | 6/1980 | Kawasaki et al. | 29/596 X |
| 4,206,624 | 6/1980 | Asai et al. | 29/596 X |
| 4,216,892 | 8/1980 | Asai et al. | 29/596 X |

*Primary Examiner*—John Gonzales
*Attorney, Agent, or Firm*—Mark A. Navarre

[57] ABSTRACT

A strip of toothed arcuate segments connected end-to-end is wound around a mandrel to form a core structure for a dynamoelectric machine. The length of the arcuate segments is such that the junctions between axially adjacent segments are sandwiched between solid portions of core material.

6 Claims, 3 Drawing Figures

STRIP WOUND DYNAMOELECTRIC MACHINE CORE

This invention relates to a dynamoelectric machine structure and to a method of making a strip wound annular rotor or stator core.

Dynamoelectric machine core structures are conventionally formed by stamping toothed annular laminations from sheet metal stock and stacking the laminations atop one another so that the teeth align in the axial direction to define core poles. Once stacked and properly aligned, the laminations are welded or otherwise secured together to complete the core assembly. Depending upon the design and size of the core structure, the above described assembly method may entail substantial wastage of the sheet metal stock. Such wastage is most evident in large diameter stator cores and in rotor cores having a relatively large inside diameter.

In order to avoid the above described wastage of material, it has been proposed to stamp the core laminations in a longitudinally extending toothed strip and to helically wind the strip around a mandrel to form a laminated core structure in which the teeth of successive laminations are axially aligned to form core poles. One example of such a technique is described in detail in the U.S. Pat. No. to Wiley 3,225,424 issued on May 16, 1967 and assigned to the assignee of the present invention. As may be seen in the above referenced patent, the bending of the strip around the mandrel is facilitated by V-shaped grooves cut along the edge of the strip opposite each of the strip teeth.

A general disadvantage of the strip winding technique is that the core material is hardened due to bending stress as the strip is wound around the mandrel. Such hardening is undesirable since it decreases the permeability of the core material and, hence, increases hysteresis losses in the core. In a core structure wound according to the teachings of the prior art, a substantial portion of the core material is hardened, and additional core material must be used to compensate for the attendant losses.

Another problem associated with prior strip winding techniques is that the inherent air gaps associated with the V-shaped grooves are aligned along the length of the core structure since the grooves are placed opposite each tooth. As a result, there is a localized absence of core material in the core structure which increases the hysteresis losses of the machine and interrupts the flux paths in the core.

A further disadvantage of prior strip winding techniques is that for a rotor core, the width of the pole teeth tips is restricted since the tips may not touch or overlap when the strip is stamped. As the strip is rolled, the tips spread further apart, increasing the effective magnetic air gap between the rotor and stator poles.

Accordingly, it is an object of this invention to provide an improved strip wound multiple pole core structure for a dynamoelectric machine wherein stress hardening in the core material is minimized, wherein areas of core material discontinuity (air gaps) and stress hardening are distributed around the core structure, and wherein the width of the pole teeth tips is not restricted by the winding method.

It is a further object of this invention to provide an improved method of manufacturing a multiple pole core structure for a dynamoelectric machine with a longitudinally extending metal strip spirally wound on a cylindrical mandrel, wherein the strip is formed of arcuate segments connected end-to-end so that the stress hardening of the core material is largely confined to the joints between arcuate segments.

It is a further object of this invention to provide an improved strip wound core structure for a dynamoelectric machine wherein the strip is comprised of a plurality of arcuate segments connected end-to-end, and wherein the length of the segments is such that inherent air gaps between segments are abutted by portions of solid core material to strengthen the core structure and to minimize the losses associated with such air gaps.

These objects are carried forward by stamping from a flat sheet of core material a longitudinally extending strip of arcuate segments joined end-to-end. Each segment has a complementary partial tooth at its ends and at least one whole tooth between the partial teeth. The segments are joined by an integral portion of core material at their outer radial end points. When the strip is wound on a mandrel, the joints between adjacent segments yield so that the ends of such segments abut edgewise to define an annular core structure. When the winding operation is complete, the partial teeth of adjacent segments are juxtaposed to form whole teeth and the stress hardening in the core is confined to the joints between adjacent segments.

The length of each segment is such that in the fully wound core, the joints and abutting edges of adjacent segments do not align axially from one lamination to the next. Thus, the joints and abutting segments edges are sandwiched between solid core material portions of the strip so that the stress hardening is distributed throughout the core, and so that the magnetic flux in the core is able to bypass the inherent air gaps between segments. In addition, this feature serves to increase the mechanical strength of the core structure.

In a rotor structure, the teeth extend radially outward so that the segments are joined at the outer radial end points of the teeth. As a result, the tips of the teeth do not move relative to each other during the bending operation and the segments may be stamped with the desired tooth tip spacing for optimizing the efficiency of the machine.

This invention results in substantial savings of material as opposed to the conventional method of stamping dynamoelectric core structures, and the disadvantages of prior art strip winding techniques are significantly reduced or eliminated.

IN THE DRAWINGS

Figure 1:
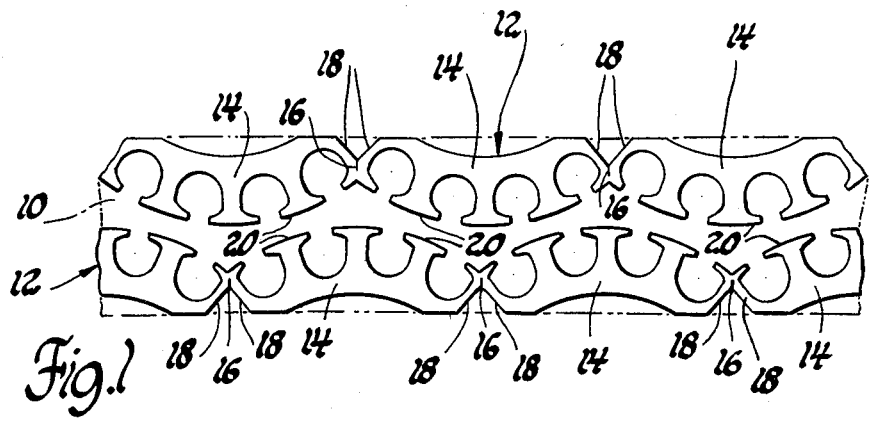
FIG. 1 illustrates the manner in which the segment strips are stamped from flat sheet metal stock to achieve the material savings.

Referring now more specifically to FIG. 1, reference numeral 10 generally designates a flat sheet of core material from which the motor laminations are stamped. Longitudinally extending strips 12 are stamped from sheet 10 by conventional techniques, each strip 12 comprising a plurality of arcuate segments 14 connected end-to-end at a yieldable joint designated by reference numeral 16. Each of the arcuate segments 14 contain complementary partial teeth 18 at the ends thereof and one or more whole teeth 20 between the partial teeth 18. The strips 12 are stamped as shown in FIG. 1 with the arcuate segments 14 in opposing relation in order to minimize the wastage of core material.

Figure 2:
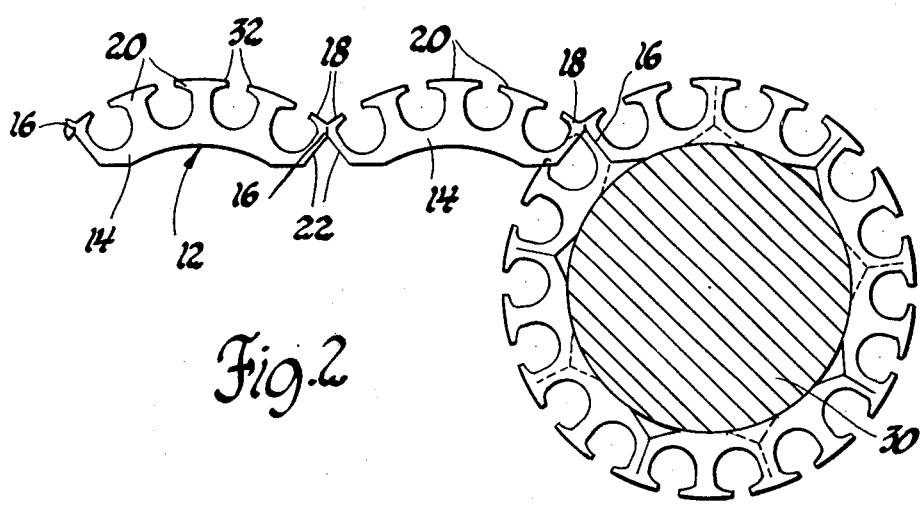
FIG. 2 shows the manner in which the segmented strip is wound to form a dynamoelectric machine rotor core.
Figure 3:
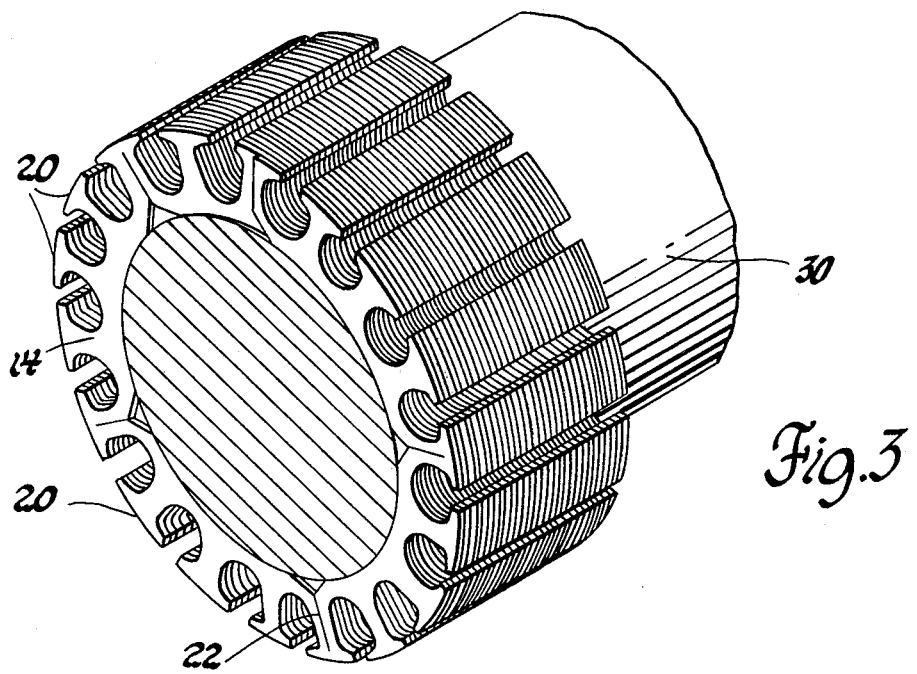
FIG. 3 is a perspective view of a completed dynamoelectric machine rotor core structure made in accordance with this invention.

Referring now to FIGS. 2-3, reference numeral 30 designates a cylindrical mandrel about which the segmented strip 12 is wound to form a core structure. When the strip 12 is helically wound around numeral 30, the joints 16 yield as the segments 14 pivot relatively inward so that the edges 22 of the partial teeth 18 abut to form whole teeth that are substantially the same size as the intermediate teeth 20. The diameter of the mandrel is so related to the spacing of the teeth 18 and 20 that juxtaposed teeth from one helical lamination to the next along the longitudinal axis of the wound core are in substantial alignment. The teeth so aligned thereby define core poles in the completed core structure as may be seen in FIG. 3.

The length of each arcuate segment 14 is so related to the diameter of mandrel 30 that the junctions 16 between adjacent segments 14 are not axially aligned from one helical lamination to the next. Consequently, each junction between adjacent segments 14 is sandwiched in the axial direction by segment portions of solid, unstressed core material. As the strip 12 is wound around mandrel 30, the segment junctions 16 are thus situated at evenly spaced intervals around the core, as may be seen by the broken lines in FIG. 2. When the core is fully wound, as shown in FIG. 3, the juxtaposed strip segments are welded or otherwise secured together in a conventional manner.

As explained above in reference to prior art, dynamoelectric machines, the disadvantage of strip wound core structures relates primarily to the increased electrical losses as compared to conventionally manufactured core structures. The increased losses are attributable to (1) stress hardening of the core material, (2) inherent air gaps associated with splits in the strip, and (3) axial alignment of the areas of stress hardening and the air gaps. Due to the manner in which the core structure of this invention is manufactured, the electrical losses associated with each of the above structural limitations in significantly reduced.

With respect to the stress hardening of the core material, the attendant magnetic losses are significantly reduced by manufacturing the strip according to the teachings of this invention since the area of core material bending is limited to the junction area 16 between adjacent strip segments 14, and does not occur at each tooth as in prior art core structures. The junction area 16 is made as small as possible but large enough so that the strip 12 may be wound around mandrel 30 without fracturing the core material of the junction 16.

With respect to the inherent air gaps associated with splits in the strip and the axial alignment of such air gaps, the attendant magnetic losses are significantly reduced by choosing the segment lengths so that the joints 16 between segments do not align axially from one helical lamination to the next. Each segment joint 16 is sandwiched by high permeability, solid core material which shunts magnetic flux around the air gaps. For the same reason, this feature also prevents the axial alignment of areas of stress hardening, such areas also being sandwiched by high permeability, solid core material. Furthermore, the sandwiching of core material air gaps between areas of solid core material tends to increase the mechanical strength of the resultant core structure.

As noted above, the length of the arcuate segments is chosen such that the segment junctions do not align axially from one helical lamination to the next. In other words, the radial length of each segment in degrees is not evenly divisible into 360°. When the teeth are evenly spaced around the core, this relationship may be stated in terms of the number of whole teeth per segment and the number N of poles in the core structure. Specifically, the total number of whole teeth per segment must not be evenly divisible into N, where two complementary partial teeth are counted as a single whole tooth. For the 18-pole core illustrated in FIGS. 2-3, the segments may thus each comprise 4, 5, 7, 8 or 9-17 whole teeth. In the illustrated embodiment, each segment comprises four whole teeth—three whole teeth and two partial teeth. Of course, the optimum number of teeth per segment depends on the design of the core structure and a general relationship may not easily be stated. It may also be understood that the strip 12 may comprise segments of unequal length and teeth, if desired.

Unlike prior art strip wound rotor cores wherein the separation between tooth tips 32 changes during the winding operation, the tooth tips 32 of a rotor core made according to this invention retain the tooth tip separation existing prior to winding. Thus, the desired tooth tip spacing may be precisely set at the strip stamping operation. This feature overcomes the problems associated with prior art strip winding techniques wherein the separation between tooth tips tends to increase as the strip is wound.

Although this invention has been principally described with reference to a rotor core structure, it equally applies to a stator core structure. For such an application, the teeth of the arcuate segments point radially inward, and, like the rotor structure, the joints between adjacent segments are at the outer radial end points of such segments. Also, it will be understood that the term "rotor" as used in describing this invention, refers to a core structure wherein the pole teeth extend radially outward whether or not the structure is adapted to rotate in a dynamoelectric machine. Similarly, the term "stator" refers to a core structure wherein the pole teeth extend radially inward whether or not the structure is adapted to be stationary in a dynamoelectric machine. Various other modifications of the disclosed embodiment will occur to those skilled in the art and such modifications may be within the scope of this invention which is limited only by the appended claims.

The embodiments of the invention in which an exclusive property or privilege is claimed are defined as follows:

1. A wound core for a dynamoelectric machine comprising a strip of core material including a continuous array of pole teeth wound in helically overlapping and abutting relation about a longitudinal axis to provide a generally annular core of stacked helical laminations in which the pole teeth of successive laminations are longitudinally aligned to define core poles, the improvement wherein:

the strip of core material is formed in a series of arcuate segments connected end-to-end by integral portions of core material providing yieldable hinge joints between the ends of adjacent segments whereby such strip can be cut out from a sheet of core material with minimal material waste, the yieldable hinge joints each being generally located at the apex of an opening separating the ends of adjacent segments so that as the strip of core material is wound about said longitudinal axis, adjacent segments pivot relatively inward about the yieldable hinge joints thereby closing the opening separating the ends of adjacent segments so as to bring such segment ends into substantial juxtaposition, whereby stressing of the strip of core material is largely confined to the area of the yieldable hinge joints, tending to minimize the electrical losses associated with such stressing of the core material.

2. A wound core for a dynamoelectric machine comprising a strip of core material including a continuous array of pole teeth wound in helically overlapping and abutting relation about a longitudinal axis to provide a generally annular core of stacked helical laminations in which the pole teeth of successive laminations are longitudinally aligned to define core poles, the improvement wherein:

the strip of core material is formed in a series of arcuate segments connected end-to-end by integral portions of core material providing yieldable hinge joints between the ends of adjacent segments whereby such strip can be cut out from a sheet of core material with minimal material waste, the yieldable hinge joints each being generally located at the apex of an opening separating the ends of adjacent segments so that as the strip of core material is wound about said longitudinal axis adjacent segments pivot relatively inward about the yieldable hinge joints thereby closing the opening separating the ends of adjacent segments so as to bring such segments into substantial juxtaposition, and the respective arcuate segments being of such lengths that within the fully wound core the stressed hinge joints and the inherent air gaps between the juxtaposed ends of adjacent segments do not coincide longitudinally from one helical lamination to the next adjacent helical laminations thereby tending to increase the mechanical strength of the core and decrease the electrical losses associated with such inherent air gaps and tending to distribute throughout the core the electrical losses associated with such stressed hinge joints and such inherent air gaps.

3. A wound core for a dynamoelectric machine comprising a strip of core material including a continuous array of pole teeth wound in helically overlapping and abutting relation about a longitudinal axis to provide a generally annular core of stacked helical laminations in which the pole teeth of successive laminations are longitudinally aligned to define core poles, the improvement wherein:

the strip of core material is formed in a series of arcuate segments connected end-to-end by integral portions of core material providing yieldable hinge joints between the ends of adjacent segments whereby such strip can be cut out from a sheet of core material with minimal material waste, the yieldable hinge joints each being generally located at the apex of an opening separating the ends of adjacent segments so that as the strip of core material is wound about said longitudinal axis adjacent segments pivot relatively inward about the yieldable hinge joints thereby closing the opening separating the ends of adjacent segments so as to bring such segments into substantial juxtaposition, and the respective arcuate segments being of such lengths that within the fully wound core the stressed hinge joints and the inherent air gaps between juxtaposed ends of adjacent segments are abutted on each side by solid substantially unstressed core material so that the abutting solid core material tends to shunt magnetic flux around said stressed joints and inherent air gaps to significantly reduce electrical losses associated therewith.

4. A wound core for a dynamoelectric machine comprising a strip of core material including a continuous array of pole teeth wound in helically overlapping and abutting relation about a longitudinal axis to provide a generally annular core of stacked helical laminations in which the pole teeth of successive laminations are longitudinally aligned to define core poles, the improvement wherein:

the strip of core material is formed in a series of arcuate segments connected end-to-end by integral portions of core material providing yieldable hinge joints between the ends of adjacent segments whereby such strip can be cut out from a sheet of core material with minimal material waste, the yieldable hinge joints each being generally located at the apex of an opening separating the ends of adjacent segments so that as the strip of core material is wound about said longitudinal axis adjacent segments pivot relatively inward about the yieldable hinge joints thereby closing the opening separating the ends of adjacent segments so as to bring such segments into substantial juxtaposition, and each segment being terminated at its respective ends by complementary partial pole teeth and including at least one solid whole pole tooth positioned between such partial pole teeth so that as the strip of core material is wound and the openings separating the ends of adjacent segments are closed, the complementary partial pole teeth at the ends of such adjacent segments are brought into substantial juxtaposition, the respective arcuate segments having such lengths and such spacings between pole teeth that within the fully wound core the stressed hinge joints and inherent air gaps between juxtaposed partial pole teeth in each helical lamination are sandwiched in the axial direction between whole solid pole teeth of adjacent helical laminations thereby tending to increase the mechanical strength of the core and to decrease the electrical losses associated with such inherent air gaps and tending to distribute throughout the core the electrical losses associated with such stressed hinge joints and such inherent air gaps.

5. A wound core for a dynamoelectric machine comprising a strip of core material including a continuous array of radially outward extending pole teeth wound in helically overlapping and abutting relation about a longitudinal axis to provide a generally annular core of stacked helical laminations in which the pole teeth of successive laminations are longitudinally aligned to define core poles, the improvement wherein:

the strip of core material is formed in a series of arcuate segments being terminated at their respective ends by complementary partial pole teeth and including at least one whole pole tooth positioned between such partial pole teeth, said arcuate segments being connected end-to-end at the outer radial end points of said partial pole teeth by integral portions of core material providing yieldable hinge joints between the ends of adjacent segments, the yieldable hinge joints being generally located at the apex of an opening separating the ends of adjacent segments so that as said strip of core material is wound about said longitudinal axis, adjacent segments pivot relatively inward about said yieldable hinge joints thereby closing the opening separating the ends of adjacent segments so as to bring such segment ends into substantial juxtaposition so that the tips of said pole teeth do not move relative to each other as said strip is wound around said axis, whereby the spacing between the tips of radially adjacent poles is determined solely by the spacing between pole teeth tips in said segments.

6. In a method of making a wound core for a dynamoelectric machine comprising the steps of cutting out from a flat sheet of core material a strip including a continuous array of pole teeth and winding such strip of core material about a longitudinal axis in helically overlapping and abutting relation to make a laminated annular core in which the pole teeth of successive helical laminations are longitudinally aligned to provide core poles, the improvement wherein:

the strip of core material is formed in a series of arcuate segments connected end-to-end by integral portions of core material providing yieldable hinge joints between the ends of adjacent segments whereby such strip is cut out from a sheet of core material with minimal material waste, the yieldable hinge joints each being generally located at the apex of an opening separating the ends of adjacent segments so that as the strip of core material is wound about said longitudinal axis adjacent segments pivot relatively inward about the yieldable hinge joints, closing the opening separating the ends of adjacent segments so as to bring such segment ends into substantial juxtaposition.

* * * * *